(12) United States Patent
Poston

(10) Patent No.: US 8,365,286 B2
(45) Date of Patent: Jan. 29, 2013

(54) METHOD AND SYSTEM FOR CLASSIFICATION OF SOFTWARE USING CHARACTERISTICS AND COMBINATIONS OF SUCH CHARACTERISTICS

(75) Inventor: Robert J. Poston, Oxford (GB)

(73) Assignee: Sophos PLC, Abingdon (GB)

(*) Notice: Subject to any disclaimer, the term of this patent is extended or adjusted under 35 U.S.C. 154(b) by 800 days.

(21) Appl. No.: 12/413,823

(22) Filed: Mar. 30, 2009

(65) Prior Publication Data

US 2009/0187992 A1    Jul. 23, 2009

Related U.S. Application Data

(63) Continuation-in-part of application No. 11/428,203, filed on Jun. 30, 2006, now Pat. No. 8,261,344.

(51) Int. Cl.
| | |
|---|---|
| G06F 11/30 | (2006.01) |
| G06F 12/14 | (2006.01) |
| G06F 12/16 | (2006.01) |
| G08B 23/00 | (2006.01) |
| G06F 9/44 | (2006.01) |

(52) U.S. Cl. .......... 726/24; 713/188; 717/127; 717/130; 717/131

(58) Field of Classification Search .............. 726/22–25; 713/187–188; 717/126–127, 130–131
See application file for complete search history.

(56) References Cited

U.S. PATENT DOCUMENTS

| | | | |
|---|---|---|---|
| 5,826,013 A | 10/1998 | Nachenberg | |
| 6,301,699 B1 | 10/2001 | Hollander et al. | |
| 6,357,008 B1 | 3/2002 | Nachenberg | |
| 6,711,583 B2 * | 3/2004 | Chess et al. ............... | 726/24 |
| 7,013,483 B2 | 3/2006 | Cohen et al. | |
| 7,069,583 B2 | 6/2006 | Yann et al. | |
| 7,080,355 B2 | 7/2006 | Carlson et al. | |
| 7,398,553 B1 * | 7/2008 | Li ............................... | 726/22 |
| 7,496,963 B2 | 2/2009 | Shipp | |
| 7,519,997 B2 | 4/2009 | Shipp | |
| 7,636,856 B2 | 12/2009 | Marinescu et al. | |
| 7,636,945 B2 | 12/2009 | Chandnani et al. | |
| 7,640,587 B2 | 12/2009 | Fox et al. | |
| 7,707,634 B2 * | 4/2010 | Sandu et al. .............. | 726/24 |
| 7,725,735 B2 | 5/2010 | Fox et al. | |
| 7,814,544 B1 | 10/2010 | Wilhelm | |
| 7,873,947 B1 * | 1/2011 | Lakhotia et al. ........... | 717/126 |
| 8,069,435 B1 * | 11/2011 | Lai ............................. | 717/106 |
| 8,108,315 B2 * | 1/2012 | Krawetz ..................... | 705/59 |
| 8,161,548 B1 | 4/2012 | Wan | |
| 8,261,344 B2 | 9/2012 | Godwood et al. | |

(Continued)

FOREIGN PATENT DOCUMENTS

WO    WO2006006144    1/2006

OTHER PUBLICATIONS

Danny Dig et al. Automated Detection of Refactorings in Evolving Components. 2006. Springer-Verlag Berlin. Heidelberg. p. 404-428.*

(Continued)

*Primary Examiner* — Christian Laforgia
(74) *Attorney, Agent, or Firm* — Strategic Patents, P.C.

(57) ABSTRACT

In embodiments of the present invention improved capabilities are described for the steps of identifying a functional code block that performs a particular function within executable code; transforming the functional code block into a generic code representation of its functionality by tokenizing, refactoring, or the like, the functional code block; comparing the generic code representation with a previously characterized malicious code representation; and in response to a positive correlation from the comparison, identifying the executable code as containing malicious code.

24 Claims, 5 Drawing Sheets

U.S. PATENT DOCUMENTS

| | | | |
|---|---|---|---|
| 2002/0073330 A1* | 6/2002 | Chandnani et al. | 713/200 |
| 2003/0110385 A1 | 6/2003 | Golobrodsky et al. | |
| 2004/0181677 A1 | 9/2004 | Hong et al. | |
| 2005/0044197 A1* | 2/2005 | Lai | 709/223 |
| 2005/0172338 A1* | 8/2005 | Sandu et al. | 726/22 |
| 2005/0187740 A1 | 8/2005 | Marinescu | |
| 2006/0015940 A1 | 1/2006 | Zamir et al. | |
| 2006/0123244 A1 | 6/2006 | Gheorghescu et al. | |
| 2006/0123480 A1 | 6/2006 | Oh et al. | |
| 2007/0016953 A1 | 1/2007 | Morris et al. | |
| 2007/0033659 A1* | 2/2007 | Hoche et al. | 726/28 |
| 2007/0239993 A1 | 10/2007 | Sokolsky et al. | |
| 2007/0240212 A1 | 10/2007 | Matalytski | |
| 2008/0010538 A1 | 1/2008 | Satish et al. | |
| 2008/0040710 A1 | 2/2008 | Chiriac | |
| 2009/0019426 A1* | 1/2009 | Baeumer et al. | 717/122 |
| 2009/0187992 A1 | 7/2009 | Poston | |
| 2009/0328011 A1* | 12/2009 | Lifliand et al. | 717/140 |

OTHER PUBLICATIONS

"U.S. Appl. No. 11/428,203, Final Office Action mailed Mar. 16, 2011", , 14.

"U.S. Appl. No. 11/428,203, Non-Final Office Action mailed May 17, 2010", , 13.

"Search Report Uncer Section 17(5)", For Application No. GB0711866.4, mailed Oct. 12, 2007.

Skormin, et al., ""In the Search of the "Gene of Replication" in Malicious Codes"", *Proceedings from the Sixth Annual IEEE Systems, Man and Cybernetics Information Assurance Workshop* 2005, 193-200.

"U.S. Appl. No. 11/428,203, Non-Final Office Action mailed Oct. 4, 2011", , 11.

"U.S. Appl. No. 11/428,203, Notice of Allowance mailed Jun. 4, 2012", SN:11428203 NPL-20 Jun. 4, 2012, 11 pgs.

* cited by examiner

METHOD AND SYSTEM FOR CLASSIFICATION OF SOFTWARE USING CHARACTERISTICS AND COMBINATIONS OF SUCH CHARACTERISTICS

CROSS-REFERENCE TO RELATED APPLICATIONS

This application is a continuation-in-part of U.S. application Ser. No. 11/428,203 filed on Jun. 30, 2006, which is incorporated by reference in its entirety.

BACKGROUND

1. Field

The present invention generally relates to classification of software, including malware and unwanted software. More particularly, the present invention relates to identification of software based on identification of certain characteristics (hereinafter called "genes") and matching such genes against certain created classifications defined as groupings of genes.

2. Description of the Related Art

Malware is a general categorization of a computer contaminant including computer viruses, worms, Trojan horses, spyware and/or adware, for example. Unlike defective software which has a legitimate purpose but contains errors, malware is written to infiltrate or damage a computer system and/or other software. Malware may also steal sensitive information, such as passwords. Some malware programs install a key logger, which copies down the user's keystrokes when entering a password, credit card number, or other useful information.

Malware includes viruses and worms, which spread to infect other executable software and/or computers locally and/or over a network, for example. By inserting a copy of itself into the machine code instructions in these executables, a virus causes itself to be run whenever the program is run or the disk is booted.

Additionally, Microsoft Word® and similar programs include flexible macro systems receptive to macro viruses that infect documents and templates, rather than applications, through executable macro code.

Worms, unlike viruses, typically do not insert themselves into other programs but, rather, exploit security holes in network server programs and start themselves running as a separate process. Worms typically scan a network for computers with vulnerable network services, break in to those computers, and replicate themselves.

Another type of malware is a Trojan horse or Trojan. Generally, a Trojan horse is an executable program that conceals a harmful or malicious payload. The payload may take effect immediately and can lead to many undesirable effects, such as deleting all the user's files, or the payload may install further harmful software into the user's system. Trojan horses known as droppers are used to start off a worm outbreak by injecting the worm into users' local networks.

Spyware programs are produced for the purpose of gathering information about computer users.

Additionally, systems may become infected with unwanted software. Unwanted software is defined as being software that is installed or used without the system owner's permission. Although unwanted software is not malicious, it can either affect performance of client machines or potentially introduce security risks and related legal risks into an organization. Such unwanted software may include adware, dialers, remote administration tools and hacking tools.

Traditional malware protection techniques are based around anti-virus vendors creating signatures for known malware and products that scan systems searching for those specific signatures.

With this approach, an identification or definition of malware and/or unwanted software is released once a lab has seen and analyzed a sample of such software. This can mean that some users may be infected before the definitions have been released. Thus, systems and methods providing detection of unknown malware and/or unwanted software to help prevent users from being infected before a definition is released would be highly desirable.

The volume of malware has increased dramatically (around 140+ Brazilian Banking Trojans per day for example). Multiple variants of the same malware threat are relentlessly created and rapidly distributed, with the aim of defeating traditional signature-based virus protection.

Some anti-virus software uses heuristics to attempt to identify unknown viruses. Heuristics techniques look at various properties of a file and not necessarily the functionality of the program. This leads to high false positive rates.

Other behavior based technologies rely on running malware and attempting to stop execution if malicious behavior is observer to happen. By allowing malware to execute, the malware may already have caused damage before it is blocked. Additionally, behavior-based technology often requires extensive user interaction to authorize false positives.

The network security threats faced by enterprises today are much more complex than 20 years ago. The exponential growth in malware is compounded by its speed of propagation and the complexity of blended threats, changing the nature of the risks. The behavior of network users is also changing rapidly. There is a need for systems and methods for proactively classifying software before malware or unwanted software causes damage.

SUMMARY

In embodiments, the present invention may provide malware detection capabilities even when the malware is written to evade gene identification and classification, such as when the malware utilizes no characteristic API sequences, purposely obfuscates strings, and the like. In embodiments, the present invention may provide methods and systems for identifying and characterizing functionality at the level of executable code. In embodiments, the present invention may be implemented as a method on a machine, as a system or apparatus as part of or in relation to the machine, or as a computer program product embodied in a computer readable medium executing on one or more of the machines.

In embodiments, the present invention may provide a computer program product performing the steps of identifying a functional code block that performs a particular function within executable code; transforming the functional code block into a generic code representation of its functionality by tokenizing, refactoring, or the like, the functional code block; comparing the generic code representation with a previously characterized malicious code representation; and in response to a positive correlation from the comparison, identifying the executable code as containing malicious code. In embodiments, the executable code may be executable software, a script, a byte code file, machine code, and the like.

In embodiments, tokenization, refactoring, and the like may eliminate portions in the functional code block that may be presented in differing versions of code that perform the same function as the functional code block. The eliminated portions may occur as a result of changed cross references due to variations in content and location of code between the differing versions. The differences may occur as a result of legitimate optimization techniques. The differences may occur as a result of malicious obfuscation techniques. The refactoring may be lossy refactoring which selectively preserves certain generic characteristics of the code without needing to maintain actual executability. In addition, the process of the present invention may include scanning the executable code, optional pre-processing of executable code to undo compression or obfuscation, quarantining software found to contain malicious executable code, running a malicious code scan on a storage medium of a computer facility that stored the executable code, removing of malicious software identified as a result of the above disinfection of legitimate software infected by malicious code identified as a result of the above, recording details of the generic code representations of functional units identified from scanning samples of both legitimate and malicious software within a threat research center, analysis of such data within the threat research center to identify families of malicious software, update a library of known code representations, and provide information for further research, and the like. In embodiments, the malicious code representation may be pulled from a library of malicious code representations, where the library may be stored on the computer performing a local code scan, accessed through a network, accessed through or updated from a threat research centre, and the like.

In embodiments, the present invention may provide a computer program product performing the steps of identifying a plurality of functional code blocks within executable code; transforming the plurality of functional code blocks into a plurality of generic code representations of its functionality by at least one of refactoring and tokenizing the plurality of functional code blocks; comparing each of the plurality of generic code representations with a plurality of previously characterized malicious code representations; and in response to a positive correlation from the comparison, identifying the executable code as containing malicious code. In embodiments, the executable code may be executable software, a script, a byte code file, machine code, and the like. In embodiments, once the plurality of generic code representations has been generated, the present invention may evaluate each generic code representation separately for the presence of malicious code, evaluate groups of generic code representations for the presence of malicious code, evaluate all generic code representations together for the presence of malicious code, and the like. That is, the presence of malicious code may be detected through the examination of a single generic code representation, or the malicious code may be detected through the examination of combinations or groups of generic code representations.

These and other systems, methods, objects, features, and advantages of the present invention will be apparent to those skilled in the art from the following detailed description of the preferred embodiment and the drawings. All documents mentioned herein are hereby incorporated in their entirety by reference.

BRIEF DESCRIPTION OF THE FIGURES

The invention and the following detailed description of certain embodiments thereof may be understood by reference to the following figures.

While the invention has been described in connection with certain preferred embodiments, other embodiments would be understood by one of ordinary skill in the art and are encompassed herein.

All documents referenced herein are hereby incorporated by reference.

DETAILED DESCRIPTION

Figure 1:
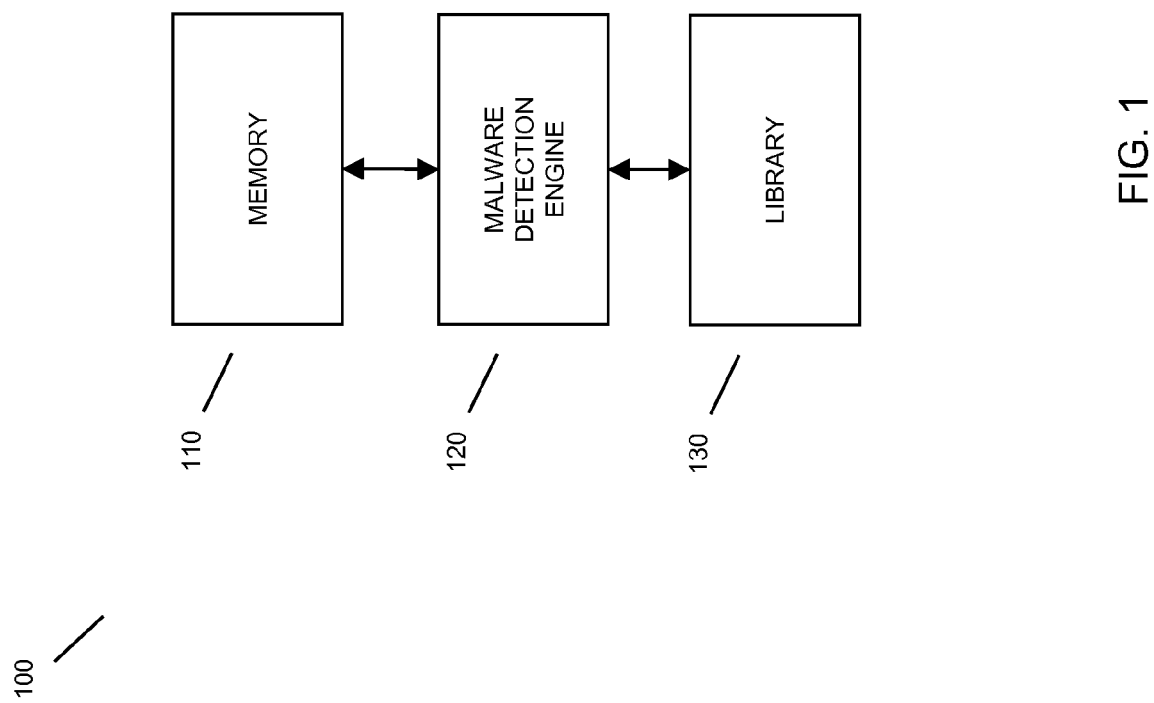
FIG. 1 illustrates a malware detection system in accordance with an embodiment of the present invention.

FIG. 1 illustrates a malware detection system 100 in accordance with an embodiment of the present invention. System 100 includes a memory 110 storing one or more files, a malware detection engine 120, and a library 130. System 100 may also include an interface (not shown) to allow a user to interact with malware detection engine 120 to trigger a malware scan, view status, view results, take action, etc.

Memory 110 may include a hard disk, a floppy disk, an optical disk, a magnetic disk, a tape, a random access memory (RAM), a read-only memory (ROM), a programmable ROM (PROM, EPROM, EEPROM), CD, DVD, flash memory, cache, buffer, register, and/or other temporary or persistent data storage. File(s) to be scanned may be temporarily and/or persistently stored in memory 110. Memory 110 may be normal computer system memory and/or special purpose memory for use in malware detection.

Library 130 includes one or more of saved checksums, malware patterns, virus and/or other malware definitions, gene information, information as classifications based on groupings of genes, etc. Library 130 is accessed by malware engine 120 to detect/classify malware in a file.

Components of system 100 may be implemented in software, hardware and/or firmware, for example. The components of system 100 may be implemented separately and/or implemented in a variety of combinations. For example, library 130 may be incorporate in malware engine 120. Components of system 100 may be implemented on a single computer system for processing software and messages. Alternatively, components of system 100 may be implemented in a distributed network where different processes occur on different machines with a communication network to allow sharing of information. System 100 may be implemented using one or more software programs.

In certain embodiments, system 100 provides both immediate and scheduled malware scanning and disinfection. Malware may be detected in a variety of ways, such as by comparing checksum of a file to a stored checksum value, pattern matching to identify known malware patterns in files, electronic mail and/or disk areas (e.g., boot sectors), emulating all or part of a file's code to try and detect malware, such as polymorphic viruses, which may reveal themselves during execution, and/or extracting and analyzing functionality from a file by matching genes and/or classifications defined from groupings of genes, e.g., PHENOTYPE™ classifications (PHENOTYPE™ is a trademark of the assignee of the present patent application). After detection, a user and/or system may be notified of detected malware, and system 100 may automatically and/or upon request attempt to disinfect, quarantine or remove detected malware or malware fragments from the file/email/disk area.

Pattern matching and other forms of detection may be performed using Virus Identity Files (IDEs) or other identity files that contain algorithms describing various characteristics of a virus and/or other malware for use in malware recognition.

Malware engine 120 loads and searches data from the input file. Malware engine 120 may use pattern matching, for example, to compare sequences of code in the file to known virus code sequences identify a particular sequence of code that is similar or identical to a virus code. Malware engine 120 may also combine pattern matching with heuristics to use general, rather than specific, rules to detect several viruses in the same family, for example. Malware engine 120 may also include a code emulator for detecting polymorphic viruses (self-modifying viruses) and/or an on-line decompressor for scanning inside archive files. Malware engine 120 may also include an OLE2 (object linking and embedding) engine for detecting and disinfecting macro viruses.

In certain embodiments, malware engine 120 receives an input file and returns a result. Virus IDE and product updates may be downloaded to account for new viruses and/or other malware, for example.

In certain embodiments, malware engine 120 may be used to scan files "on-demand." A user may identify files or groups of files to scan immediately.

On-demand scanning may also be scheduled by a user. For example, the user specifies a time at which to scan a selected group of files. At the scheduled time, malware engine 120 scans the selected files that are already stored, for example, in memory 110. A user or users may establish multiple schedules for malware scanning. Different configurations may be set for each scheduled scan. Alternatively and/or in addition, certain embodiments provide on-access malware detection using malware engine 120.

In certain embodiments, malware engine 120 intercepts open file or file close or file access requests, for example, by a user, an operating system, an application, etc.

In certain embodiments, a user may specify which files to check via a scheduled and/or on-access scan. That is, a user can include and/or exclude certain types of files from malware scanning. Additionally, the user may configure system 100 to check files on read, on write, and/or on rename, for example. The user may also configure system 100 to block access to the file, or to automatically initiate disinfection, removal and/or quarantine of a file upon finding malware in the file.

In certain embodiments, system 100 may be used to identify malware by extracting functionality from a file and classifying the functionality. In certain embodiments, malware engine 120 may classify functionality and identify malware without requiring a most up-to-date set of virus and/or other malware definitions. Malware engine 120 may classify a file and/or functionality within a file as malicious, non-malicious, suspicious, etc. based on functionality and/or relationships between or combinations of functionality, for example. Alternatively and/or in addition, malware engine 120 may identify a particular malware program represented by and/or included in the file.

Figure 2:
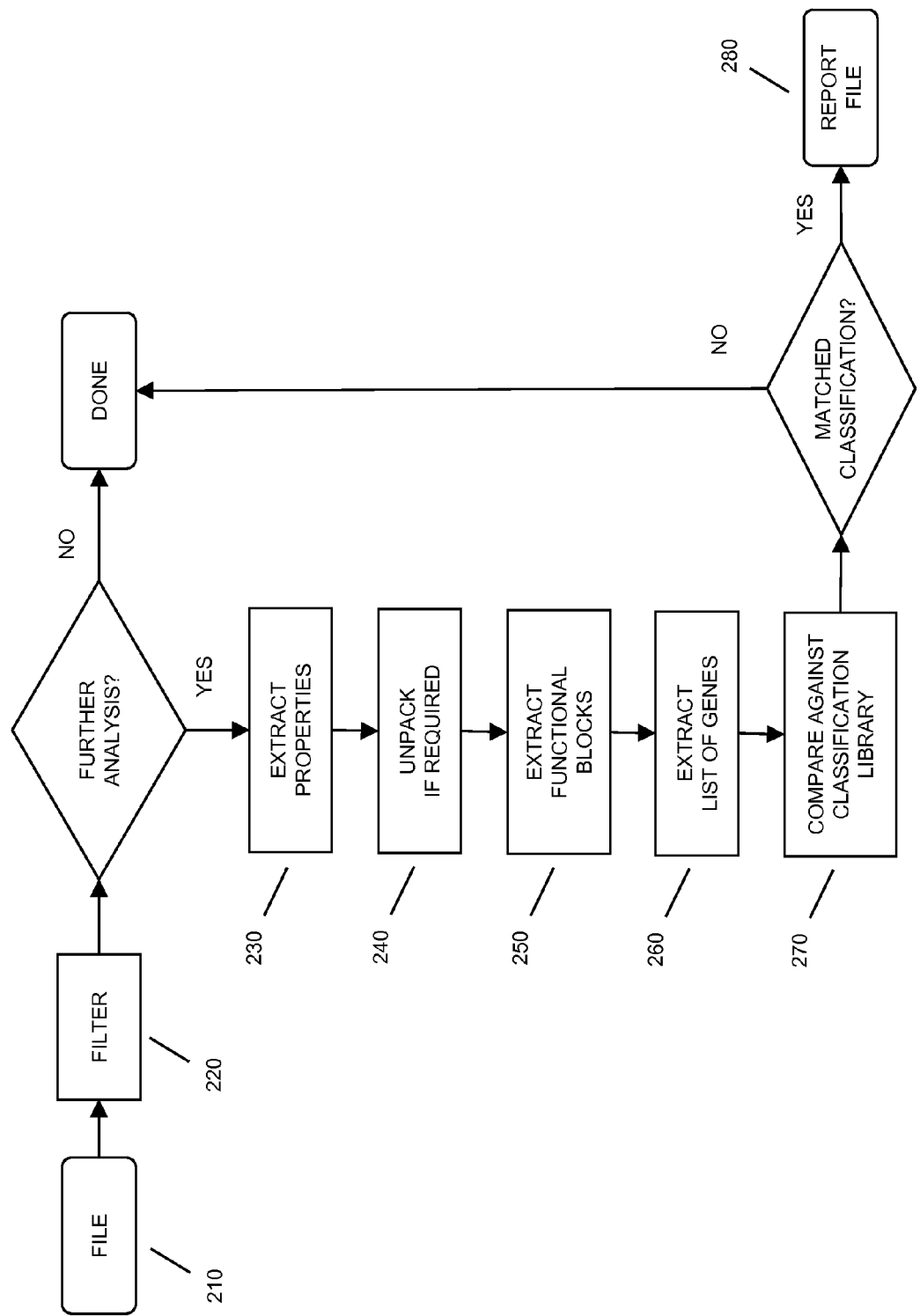
FIG. 2 depicts a flow diagram for a method for software classification in accordance with an embodiment of the present invention.

FIG. 2 depicts a flow diagram for a method 200 for software classification in accordance with an embodiment of the present invention. At step 210, analysis of a computer file or other sample to be checked is commenced. At step 220, the file is filtered. This is a series of quick checks to determine whether a file needs further analysis. For example, one or more files may be screened for efficiency reasons. If a file is packed, for example, a malware detection system may spend more time checking the file. If a file passes a checksum test, for example, the software classification system may not further examine the file.

In certain embodiments, at step 230, properties are extracted from the file. For example the file size or name may be extracted.

In certain embodiments, the file is unpacked if necessary (step 240). For example, malware may be obfuscated using run-time packers, which render static analysis of code difficult. Packing is a process of transforming a program file, using compression and/or encryption, so that its functionality is obfuscated. Unpacking is a method of restoring a packed program file to its unpacked state, so that the functionality is no longer obfuscated. This is done using decompression and/or decryption, for example.

At step 250, the function blocks are extracted from the file. These functional blocks include sequences of application program interface (API) calls, string references, etc., which illustrate the function and execution flow of the program. Functional blocks are extracted from a program file's binary code. While various instances of software may use common code and similar techniques, the resulting compiled bytes can be very different. The same source code can be compiled using different compilers to produce different binary files. The compiled bytes are different but the files are functionally the same. Functional blocks provide a high level view of the functionality of a file regardless of binary compilation.

At step 260, each functional block is searched for genes to build a list of genes present in the file. Different types of functionality (classified as genes, for example) may be extracted from the sequenced blocks. A gene is piece of functionality or property of a program. Each piece of functionality is described using sequences of APIs and strings, which can be matched against functional blocks. A matching functional block includes the APIs and strings in the correct order. The gene and the functional block do not need to match exactly. A functional block may contain more than one gene. Genes are defined using a gene definition language, for example. Each gene describes or identifies a different behavior or characteristic of malware or other file. For example, malware may copy itself to a % SYSTEM % directory. Therefore, a gene may be created to identify this functionality by matching the sequence of API calls and the strings that are referenced.

At step 270, the list of genes is compared against a library of classifications of genes. A classification of gene combination has been detected if all the genes contained in that gene combination are present in the list of genes identified in the file.

A classification of genes represents a certain class of software. A classification of genes is a combination of genes used to describe or identify a class of software program. For example, a classification of genes to match an IRC Bot malware file (an independent program that connects to an Internet Relay Chat (IRC) and performs automated functions) may include the following genes:

| | |
|---|---|
| SockSend | Socket based activity |
| RunKey | Sets a run key |
| Exec | Executes other programs |
| CopySys | Copies itself to the system directory |
| AVList | Contains a list of AV (anti-virus) products |

-continued

| | |
|---|---|
| IRC | IRC references |
| Host | References the hosts file |

At step 280, an output is generated. For example, the most significant classification may be reported. Alternatively and/or in addition, all identified classifications, genes and/or software classifications may be reported. Reporting may include generating and/or editing a log file, printing an output, emailing an output, generating an audible output, generating a visual output, facsimile transmission of an output, electronic storage of an output, etc. In addition to reporting, an output may include disinfection, deletion, and/or quarantine of the file and/or related files, for example.

For example, the following functional block sequenced from a software program matches three genes ("CopySys", "Runkey" and "Exec"):
GetSystemDirectoryA [0046]GetModuleHandleA
GetModuleFileNameA [0048]"tftpd.exe" [0049]
"winhlpp32.exe"
  strcat
  strcat
  "software\microsoft\windows\current\version\run"
  RegCreateKeyExA
  strlen
  RegSetValueExA
  RegCloseKey
  CopyFileA
  CreateProcessA The gene "CopySys" copies itself to a system folder and includes the following functions, for example:
  GetSystemDirectoryA
  GetModuleHandleA
  GetModuleFileNameA
  ".exe"
  CopyFileA The gene "Runkey" sets a run key and includes, as an example, the following functions:
  "software\microsoft\windows\current\version\run"
  RegCreateKeyExA
  RegSetValueExA The gene "Exec" executes other programs and includes, as an example, the following functions:
  CreateProcessA The three genes in this example form a classification defined by a group of the three genes, and may be used to classify the software as malicious, suspicious, unwanted, etc.

Figure 3:
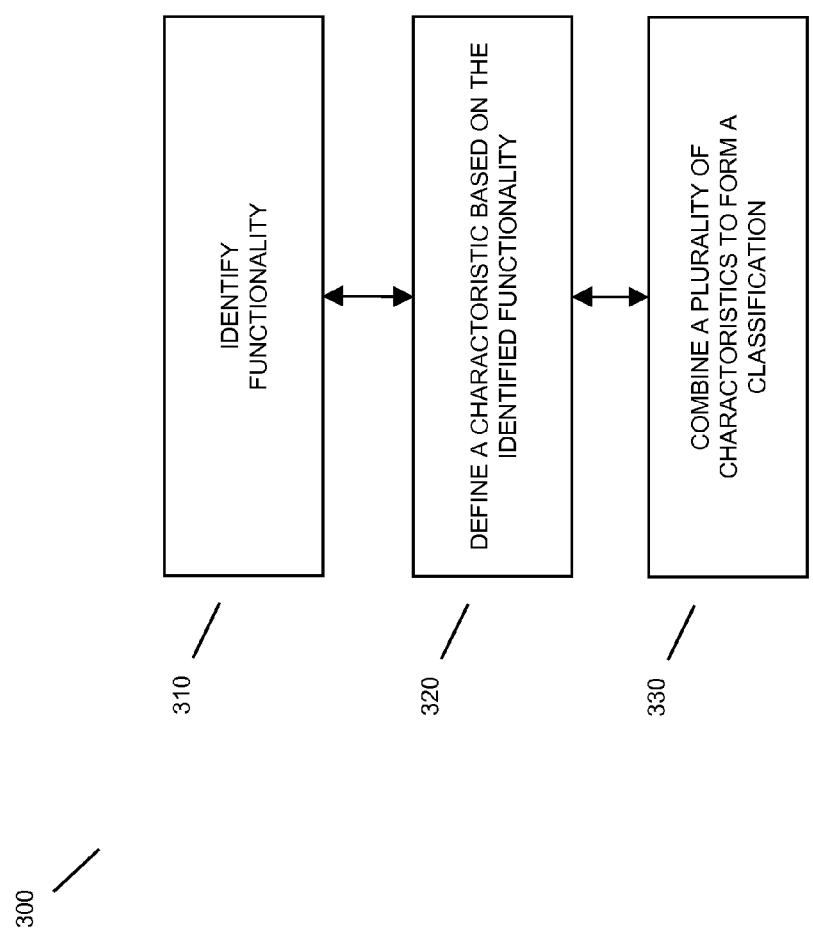
FIG. 3 illustrates a flow diagram for a method for generating genes and groupings of genes for software classification in accordance with an embodiment of the present invention.

FIG. 3 illustrates a flow diagram for a method 300 for generating genes and classifications defined by groupings of genes to be used for malware and/or other software classification in accordance with an embodiment of the present invention. At step 310, software functionality is identified. For example, the functionality for copying code to a system directory is identified. At step 320, a software characteristic is defined based on the identified functionality. For example, the characteristic 'CopySys' from the above example is defined based on the identified copy functionality.

At step 330, a plurality of software characteristics are combined to form a software classification. For example, the characteristics listed in the examples above: 'SockSend, RunKey, Exec, CopySys, AVList, IRC, and Host' are combined to form a classification for an 'IRC Bot' program.

In certain embodiments, functionality is common to both malware and normal programs. Malware may be identified and/or classified based on combinations of such functionality. In certain embodiments, both malware and non-malware programs may be classified according to a variety of genes and/or groupings of genes. For example, unwanted software may be classified according to extracted functionality.

Thus, certain embodiments provide systems and methods to extract functionality of a file to identify malware and/or other types of software programs. Certain embodiments may be used to find functionally similar files, such as by using a "Query by Functionality" search. Certain embodiments detect malware without requiring new patterns to be written for pattern matching detection. Certain embodiments reduce a false positive rate by matching on functionality, rather than heuristics, to describe a type of malware. Certain embodiments allow computers and/or software to be checked for licensing compliance and software updates.

In embodiments, the present invention may provide malware detection capabilities even when the malware is written to evade gene identification and classification, such as when the malware utilizes no characteristic API sequences, purposely obfuscates strings, and the like. In embodiments, the present invention may provide methods and systems for identifying and characterizing functionality at the level of executable code.

Figure 4:
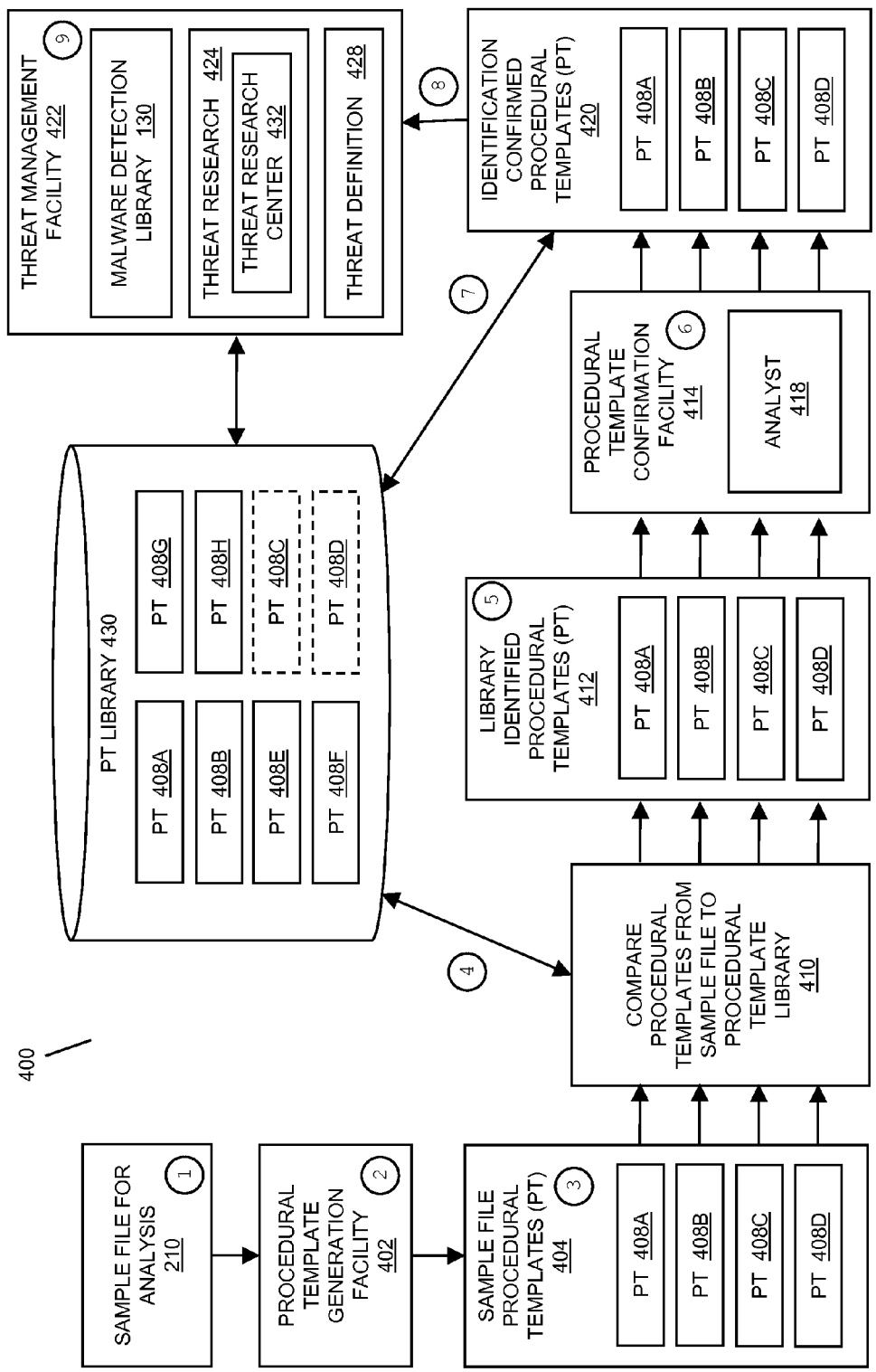
FIG. 4 depicts a flow diagram for the utilizing procedural templates in accordance with an embodiment of the present invention.

FIG. 4 illustrates a flow diagram for a method 400 of generating, storing, and classifying procedural templates (PT) for the pre-emptive detection of malware, where a PT may be formed from breaking executable code from received files down into their component procedures (e.g. functional units). In embodiments, the actual byte-code for each procedure may then be converted into a more generic code, referred to as a 'procedural template', representing its general functionality. This may enable the spotting and tracking of relationships between variant malware samples. In embodiments, the present invention may make malware authors' attempts at obfuscation more difficult, and even counterproductive, where procedural template analysis may identify the obfuscation algorithms themselves as highly suitable detection material. In addition, PTs may be classified, such as clean library code, as code representative of a particular malware family, and the like. The benefits that may result from use of PTs may include faster analysis and classification of individual malware samples, identification of previously unrecognized malware families, providing useful data of common patterns for generic detection, incorporation of the invention into a malware engine, automated generation of template signatures for pro-active detection, evolutionary tracking of how malware families evolve, rapid response to malware authors as they continually change their code to break pro-active detection, and the like.

Figure 5:
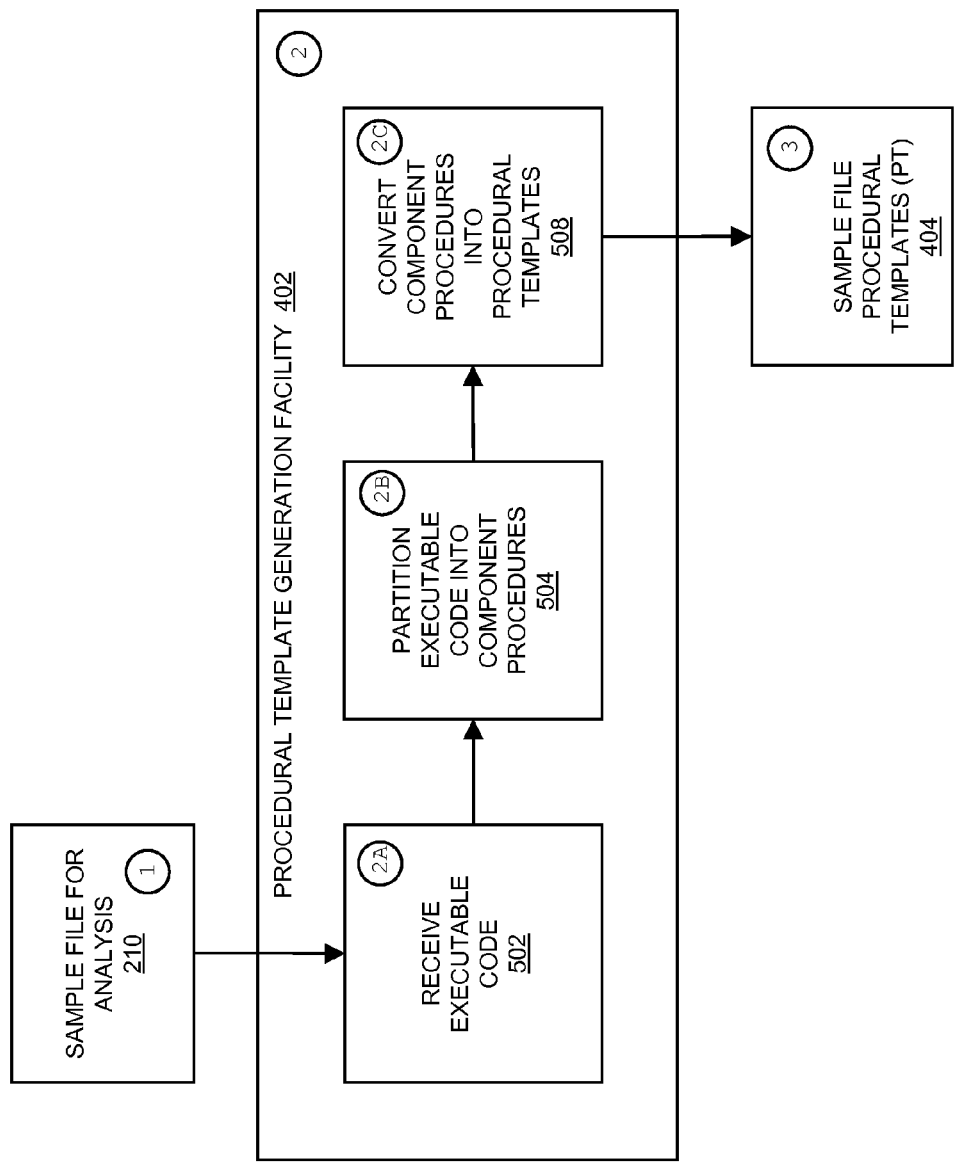
FIG. 5 depicts a more detailed flow diagram for the procedural template generation facility in accordance with an embodiment of the present invention.

FIG. 5 illustrates a more detailed view of the beginning of the process flow that is shown in FIG. 4. Here, the sample file is first received for analysis 210 and provided to a PT generation facility 402. The file may be received such as an executable file 502, a script, a byte code file, or the like. Component procedures may then be identified within the executable file 504, where each component procedure represents a functional unit. Functional units may be defined in several ways, and it should not be assumed that "functional" means "observable functionality." For example, malicious software often includes code to obfuscate its behavior, and these obfuscation techniques may themselves be regarded as functional units. Also note that this breakdown into functional units is not necessarily a strict partition. Some functional units may overlap, and some may be sub-units of larger units. The component procedures may then be converted 508 into PTs. In embodiments, each PT may represent the general functionality of its functional unit.

In embodiments, the process of converting the raw data for a functional unit within a sample into the generic representation as a PT 508 may be highly configurable. For example the system designer might aim to set the level of "genericity" to satisfy various criteria. Should a new PT be judged as similar (according to some suitably designed comparison algorithm) to a previously classified PT, there is a high degree of probability that the functional unit generating the PT can be regarded as a new variant of the previous functional unit, and that the new PT can be given the same classification as the previous PT. When a sample file is being analyzed, if any of the PTs it generates are classified as malicious, then that sample can reasonably be assumed to contain malicious functionality and can be classified as malware. Should two sample files produce similar sets of PTs, it is highly likely that those two files are variants of each other. (Note, this may be two variants of the same malware family, or in the case of "clean" samples it may be that the new sample is an updated version of a legitimate software application.) In embodiments, there may be many other criteria established.

Referring to FIG. 4 again, the sample file PTs may now be presented for comparison and confirmation 404. In embodiments, PTs may be classified according to whether the functionality they represent is judged to be clean (i.e. not related to any malicious behavior), suspicious or malicious. First, the sample file PTs may be compared 410 against the existing library of PTs. Some of the PTs may be found in the library 412, some may be automatically identified as similar to, and therefore a possible new variation of, a previously seen PT, and others may not be found at all. In the example portrayed in FIG. 4, PT 408A and 408B have been found in the library, whilst 408C and 408D are not found to match any PT currently in the library.

In embodiments, the step of confirming 414 a PT as a new variant of a similar PT or of classifying a previously unclassified PT may require confirmation by a secondary source, such as a human analyst. Some PTs may be classified as representing clean, suspicious, or malicious behavior, whilst other PTs may be left unclassified. Statistical information within the database, or information from other systems, may be used to automatically classify a PT, or to prioritize which PTs are requiring human classification. For example, a PT frequently seen in files known to be legitimate applications might automatically be classified as clean, whilst a PT frequently seen in some malware samples might be prioritized for human classification.

In the example shown in FIG. 4 the system may decide that 408C seems similar to another previously seen template, say 408E. Suppose 408E was first seen in a malware file and classified as representative of malicious functionality characteristic of that malware family. This information may be presented to an analyst and this analyst may confirm that 408C does indeed represent a slight variation of the previously seen functionality, is still malicious, and that the new sample is a variant of the previous seen malware sample. In embodiments, "analyst" may refer to a human analyst, to an automated agent able to make classification decisions according to certain predefined rules (possibly using other information from other systems), and the like.

Continuing with the example portrayed in FIG. 4, given that 408D has not been seen before and is not recognized as similar to anything previously seen, the analyst may chose not to spend time analyzing and classifying 408D. Meanwhile, 408B may have already been seen in several files, and may already be classified, perhaps as a clean "library procedure" (e.g. functionality from a standard programming library, such as a function to concatenate two text strings into a longer text string.) However, suppose that 408A, even though it has already been seen maybe once or twice before, is not yet classified, yet has only been seen in malicious files. The analyst may note these facts and decide to further investigate the functional unit producing this template. The analyst may discover that the code for this functional unit is unique to, and a defining characteristic of, the malware family. Therefore template 408A may be classified as malicious. The analyst may also use this information about 408A to provide updated generic detection for the malware family in a malware detection engine.

For each PT, whether or not it has previously been seen, and whether or not it is classified, the library may automatically be updated 420 with statistical information as to how frequently that PT is seen in sample files. In the example given, 408C and 408D may be automatically added to the PT Library as new PTs, statistics may be updated for how frequently 408A and 408B have been seen, and any updates to classifications may also be recorded in the PT Library. In embodiments, a malware sample may contain a combination of both clean and malicious functional units. For example, a malicious program might check its current location, and if not in the system folder, it might copy itself to the system folder and set a registry key to automatically execute this copy. Whilst the functional unit for copying the file to the system folder and setting a run key would be regarded as suspicious, the checking of its original location might well include a smaller functional-unit to compare two strings. The PT for this smaller functional unit would be classified as clean because the comparison of two strings is, in itself, a perfectly innocent operation also used in many legitimate software programs.

Within threat research centers, an embodiment of the present invention may provide various additional pieces of information for threat research 424. The possibility exists to link expert analysis and comments to PTs, thus saving duplication of work when the same PTs are seen repeatedly in multiple samples. The database may be replicated across multiple threat research centers around the world, for example where there is a requirement to provide 24×7 coverage and response, thus providing a global expert knowledge sharing system. Should an embodiment be deployed outside of a threat research center 432, for example within a consumer malware detection engine, then PTs may be identified as requiring further evaluation, such as a PT previously unseen but similar to one classified as malicious. Sample files with a suspicious combination of PTs or other characteristics, may (subject to appropriate consent) be sent back to a threat management facility as a part of on-going threat research 424, for further identification associated with threat definitions 428, and the like.

In embodiments, the system 400 may include a threat management facility 422, a threat management and update system operating to protect and update various endpoints and network appliances, such as within a customer's enterprise. The threat management facility 422 may maintain central policy and remedial action facilities that provide instructions to the endpoints supported by the threat management facility 422. The threat management facility 422 may provide an enterprise protection from computer-based malware, including viruses, spyware, adware, Trojans, intrusion, spam, policy abuse, uncontrolled access, and the like, where the enterprise may be any entity with a networked computer-based infrastructure. The threat management facility 422 may provide protection to an enterprise against a plurality of threats. The enterprise may be corporate, commercial, educational, governmental, or the like, and the enterprise computer network may be distributed amongst a plurality of facilities, and in a plurality of geographical locations. The threat management facility 422 may include a plurality of functions, such as security management facility, policy management facility, update facility, threat definitions facility 428, network access rules facility, remedial action facility, detection techniques facility, testing facility, threat research facility 424, and the like. In embodiments, the threat protection provided by the threat management facility 422 may extend beyond the network boundaries of the enterprise to include client facility's that have moved into network connectivity not directly associated or controlled by the enterprise. Threats to the enterprise client facilities may come from a plurality of sources, such as from network threats, physical proximity threats, secondary location threats, and the like. In embodiments, the threat management facility 422 may provide an enterprise protection from a plurality of threats to multiplatform computer resources in a plurality of locations and network configurations, with an integrated system approach.

In embodiments, the threat management facility 422 may be provided as a stand-alone solution. In other embodiments, the threat management facility 422 may be integrated into a third-party product. An application programming interface (e.g. a source code interface) may be provided such that the threat management facility 422 may be integrated. For instance, the threat management facility 422 may be stand-alone in that it provides direct threat protection to an enterprise or computer resource, where protection is subscribed to directly. Alternatively, the threat management facility 422 may offer protection indirectly, through a third-party product, where an enterprise may subscribe to services through the third-party product, and threat protection to the enterprise may be provided by the threat management facility 422 through the third-party product.

In embodiments, the threat management facility 422 may utilize the PT library for threat detection, such as with a malware detection engine in association with a malware detection library 130. Further, in embodiments, the system 400 may be associated with the malware detection library 130, threat research 424, threat definition 428, and the like. In embodiments, the system (400) may be an automated system capable of real-time, or near real-time detection of malware threats.

In embodiments, the file classification system associated with the PT library 430 may be extended to make decisions upon combinations of PTs, or may incorporate other information (for example from alternative technologies within a malware detection engine, from other sample analysis systems, and the like) to help it make a decision, such as shown in the threat management facility (422) of FIG. 4. An example use of file classification may include a file classification system at the threat research center 432, which may be connected to the PT analysis system so that combined data from the two systems may be used to produce data for a malware detection engine. This may include using PT matching to arrange samples into sets of similar files. In embodiments, in the case of malicious samples such groups may be known as malware families and different samples within the family known as variants. This ability to sort samples into groups may greatly aid the identification of new malware families and the production of generic detection for such families. Another example may include incorporation of PT generation and a selected subset of data from the PT library into the malware detection engine itself, so that PT matching techniques may be used to directly detect new variants of malware families. In embodiments, for performance reasons, the implementation of PT generation in a consumer malware detection product may be a limited form of that used at a threat research center 432. Meanwhile, a more powerful system at the threat research center may enable rapid identification and response (e.g., within a few minutes) to targeted threats attempting to evade the detection in consumer products.

In embodiments, PT analysis may provide for a system of malware prevention through the creation of a PT library 430 that characterizes the functional units of previously received computer files. The characterization of functional units extracted from a computer file (or other data source) by conversion of raw data into a set of generic representations (i.e., procedural templates) may be performed through filtering, generalization, refactoring, tokenization, lossy refactoring techniques, flagging of notable characteristics, and the like. The automated grouping of computer files, such as at a threat research center, may be by pattern matching on the generated procedural template sets, and the classification (such as clean or malicious) of the files may be by rule-based and/or supervised classification of procedural templates. The use of data from this system may then enable the proactive classification of previously unseen files in a malware detection engine, such as by conversion of data into other detection algorithms native to the engine, by the inclusion of procedural template generation techniques within the engine and the supplying of template classifications to its threat library, and the like.

In embodiments, the process of developing PTs may begin with a step of pre-processing. For example, pre-processing may include the unpacking of recognized "packer" algorithms (e.g., compression algorithms, encryption algorithms, etc.), the use of emulation to unpack unrecognized packers, and the like. In embodiments, this step may be optional, and when pre-processing is not used, new packers may be identified and classified by PT analysis of the actual unpacking code, whilst pre-processing may enable classification of the underlying original file.

In embodiments, the process may begin with the identification and extraction of functional units, where various pieces of raw data might be used as functional units. For example, within an executable binary, the system may process blocks of machine code bytes, or sequences of API calls ripped from the code, or textual words and strings ripped from the file. Different kinds of data may be processed in parallel (For example, sets of code templates, API templates, and string templates might each be generated from the one file) or a more integrated approach may be used. For example, strings may be grouped according to the code blocks from which they are referenced, or even interlaced with code to produce integrated "code+strings" templates.

In embodiments, code blocks may be identified in various ways. For example, recursive following of procedure calls, noting the start and end of each call; linear scanning of code for certain "markers" which delimit code blocks; and the like. The latter technique may also be appropriate for text based mark-up and script files, where functional blocks may be delimited by mark-up tags or by braces outside of quote delimited strings.

In embodiments, filtering, generalization, refactoring, tokenization, lossy refactoring, and the like, may be utilized in the creation of PTs. For instance, tokenization may be a technique used to convert values that can easily change (e.g. a name or a memory address) to predefined generic codes representing the type of that object. For example:

lea eax, [ebp-208] may be tokenised to lea eax, [stackref1]; and push offset "sv" may be tokenised to push string_offset.

In embodiments, anything that has specialised meaning (e.g. the instruction codes lea, push) is not tokenised, except where there are multiple ways of saying the same thing. In such cases all equivalent formulations may be converted to the same token. Another good example of the usefulness of tokenization may be in scripts, where malware authors often change the script by randomizing the names of objects. For example a randomly named variable declaration
   var rxEDkY=579;
might be tokenized to
   var varname1=number;
If the next sample of the script used different random names, they may still be converted to the same tokens as above and hence produce a matching template.

In embodiments, refactoring may be a technique commonly used in compilers to optimize code by replacing some code sequences with functionally identical but more efficient equivalents. However, similar techniques may be used to convert functionally equivalent variations of code to the same generic representation of its functionality. For example, some refactoring techniques may identify and remove "polymorphic junk" instructions. Furthermore, the system may be primarily concerned with the general information content and may not have to refactor code into equally functional code. Thus refactoring may be "lossy" (a term more often used in compression of sound or images where some fine detail may be lost but the most important information is retained), and this may even help a system aiming to find matches for functionally similar (not just exactly equivalent) code.

In embodiments, refactoring may be independently applied to each functional unit. The following example is a textual representation of a PT generation process upon a block of x86 assembly code. In actuality the processing may be performed starting from raw "machine code" bytes, which may be converted during processing into customized codes of the generic functionality, called template codes. Also note that, although refactoring my usually refer to processing executable code, the present invention may only be interested in the underlying information content. Therefore similar techniques may also be applied to other informational data.

The following code block may be representative of an example of malware which uses a technique of obfuscating a string (in this case the suspicious filename "svch0st.exe") by breaking it into pieces and reconstructing it at run-time via a series of calls to a standard library function (_strcat). This technique may prevent straightforward detection upon the strings within a file, and also may make signature based code detection rather ineffective because malware authors can easily produce new variants just by changing the way in which the string is broken up. However, the following refactoring process provides an exemplary embodiment of an algorithm which may produce the same characteristic template no matter how the string is changed or broken up (i.e., this is a purely code based template which generalizes all string references to the same "string_offset" code), even if the number of pieces it is broken into is changed. Furthermore the example contains some randomly inserted junk instructions (in this case simple "nop" instructions) and there is also evidence of tweaking the order of some instructions.

Example Source Code:
```
lea eax, [ebp-208]
nop
push offset "sv"
push eax
call _strcpy
nop
nop
push offset "ch0"
push eax
call _strcat
push offset "st.e"
lea eax, [ebp-208]
nop
push eax
call _strcat
lea eax, [ebp-208]
nop
push offset "xe"
nop
push eax
nop
nop
nop
call _strcat
lea eax, [ebp-208]
push eax
call Sub__401400
add esp, 3Ch
lea eax, [ebp-320]
push eax
lea eax, [ebp-208]
nop
push eax
call API_FindFirstFileA
push eax
nop
nop
pop ebx
cmp ebx, 0FFFFFFFFh
jz short loc__401130
```

In embodiments, the process may begin with filtering and generalization. In this instance, obvious junk (such as nop instructions) can be filtered out. Details likely to vary (such as some numerical values and the actual address of subroutines and string offsets) can be converted to standard tokens. However, where the analyzer recognizes, for example, a call to a standard library function, it may retain a token to identify that particular function.

This may produce a PT such as:
```
lea eax, [stackref1]
push string_offset
push eax
call _strcpy__
push string_offset
push eax
call _strcat__
push string_offset
lea eax, [stackref1]
push eax
call _strcat__
lea eax, [stackref1]
push string_offset
push eax
call _strcat__
lea eax, [stackref1]
push eax
call _CustomSub__Modify_Stack_Pointer
lea eax, [stackref2]
push eax
lea eax, [stackref1]
push eax
call _API_FindFirstFileA__
push eax
pop ebx
cmp ebx, _const__
jz _CodeReference
```

In embodiments, a next step may include canonical reordering and substitution, where rules may be used to replace certain "canned sequences" of instructions with functional equivalents. For example, after filtering it is seen that the above code contains a "push eax; pop ebx" sequence. This would more normally be implemented as a single "move ebx,eax" instruction, so that substitution can be made.

Whilst most instructions in code have to be in a certain order to work as desired, some instruction combinations are "order-independent" and may be reordered (either as a result of a compiler optimization setting, or by deliberate tweaking.) In the above it is seen that pairs of "lea eax, [stackref1]" and "push string_offset" instructions sometimes occur in one order and sometimes in another. A reordering rule may rearrange order-independent combinations into a predefined order. After these rules are applied, the following template may be obtained:

```
lea eax, [stackref1]
push string_offset
push eax
call _strcpy_
push string_offset
push eax
call _strcat_
lea eax, [stackref1]
push string_offset
push eax
call _strcat_
lea eax, [stackref1]
push string_offset
push eax
call _strcat_
lea eax, [stackref1]
push eax
call _CustomSub_
Modify_Stack_Pointer
lea eax, [stackref2]
push eax
lea eax, [stackref1]
push eax
call _API_FindFirstFileA_
mov ebx,eax
cmp ebx, _const_
jz _CodeReference_
```

In embodiments, a next step may include contraction. An example of contraction may be the spotting of repeated sequences. For example:

```
lea eax, [stackref1]
push string_offset
push eax
call _strcpy_
REPETITION:
push string_offset
push eax
call _strcat_
lea eax, [stackref1]
END_REPETITION
push eax
call _CustomSub_
Modify_Stack_Pointer
lea eax, [stackref2]
push eax
lea eax, [stackref1]
push eax
call _API_FindFirstFileA_
mov ebx,eax
cmp ebx, _const_
jz _CodeReference_
```

In embodiments, it may be a deliberate design choice not to record the number of repetitions within the template. This may be so that, as in the above example, new variations which break the string into a different number of pieces may still be characterized by the same template. This completes the refactoring for this example. In embodiments, the refactoring algorithm may repeatedly try various refactoring rules until no further refactoring can be found.

Continuing with this example, in embodiments a next step in the process may include flagging. The templates produced by refactoring may be enhanced by flagging various facts along the way. For example, the above process may flag a plurality of characteristics, such as contains junk instructions count (e.g. 12), contains unusual instruction reordering, contains push-pop sequences, one repetition with count three, initial instruction count (e.g. 40), final template objects count (e.g. 21), compression ratio (e.g. 52%), and the like. These characteristics may or may not be included in the pattern matching process. For example, an analyst at a threat research center may query a database for all occurrences of the above code, independent of any of the statistical counts, and then may make a further query to see, for example, what the typical range of "junk instruction count" is. Such information may be important for designing efficient detection in a consumer malware product. Such as, a quick test may be made to estimate the number of junk instructions near the start of the code in a file, and then more expensive processing may only be performed if this number exceeds a certain threshold.

In embodiments, the procedural templates may be the final results of the process, such as in generalization, refactoring, flagging algorithms, and the like. Note that the above processes are highly configurable. For example, a successful prototype may be implemented using little more than the "generalization" technique. Alternatively, a much more aggressive refactoring algorithm might be used to identify polymorphic packers. An extreme approach might aim to produce templates with little or no "sequential data" but lots of flags and statistical information gathered during the processing. For example, an alternative algorithm might reduce the code example given earlier to a template such as:

—Flags for Exact (or Near Exact) Matching—Calls _strcopy Calls
_strcat Calls _API_FindFirstFileA_ Contains junk instructions.
Contains unusual instruction reordering.
Contains push-pop sequences
Contains repetition
—Statistical Data for Range Based Queries—Number of Non-Library
subroutine calls 1 Junk instruction count 12
1 Repetition with count 3
Initial Instruction count 40
Final template objects count 21
Compression ratio 52%

In embodiments, a combination of techniques might be used. For example each functional unit might generate both a "strong" (little refactoring) and a "weak" (aggressively refactored or flag and statistic based) PT, and the pattern matching system may then select whichever information works best for the type of file being analyzed. For example, just one or two matches upon "strong templates" might be enough to identify a file as a new variant of malware written with a high level language compile, whereas if the file has no "strong template" matches, but good matches to "weak templates" characteristic of code from a particular polymorphic packer, that might indicate a new sample packed with that packer.

In embodiments, the present invention may provide a computer program product performing the steps of identifying a functional code block that performs a particular function within executable code; transforming the functional code block into a generic code representation of its functionality by tokenizing, refactoring, or the like, the functional code block; comparing the generic code representation with a previously characterized malicious code representation; and in response to a positive correlation from the comparison, identifying the executable code as containing malicious code. In embodiments, the executable code may be executable software, a script, a byte code file, machine code, and the like.

In embodiments, tokenization, refactoring, and the like may eliminate portions in the functional code block that may be presented in differing versions of code that perform the same function as the functional code block. The eliminated portions may occur as a result of changed cross references due to variations in content and location of code between the differing versions. The differences may occur as a result of legitimate optimization techniques. The differences may occur as a result of malicious obfuscation techniques. The refactoring may be lossy refactoring which selectively preserves certain generic characteristics of the code without needing to maintain actual executability. In addition, the process of the present invention may include scanning the executable code, optional pre-processing of executable code to undo compression or obfuscation, quarantining software found to contain malicious executable code, running a malicious code scan on a storage medium of a computer facility that stored the executable code, removing of malicious software identified as a result of the above disinfection of legitimate software infected by malicious code identified as a result of the above, recording details of the generic code representations of functional units identified from scanning samples of both legitimate and malicious software within a threat research center, analysis of such data within the threat research center to identify families of malicious software, update a library of known code representations, and provide information for further research, and the like. In embodiments, the malicious code representation may be pulled from a library of malicious code representations, where the library may be stored on the computer performing a local code scan, accessed through a network, accessed through or updated from a threat research centre, and the like.

In embodiments, the present invention may provide a computer program product performing the steps of identifying a plurality of functional code blocks within executable code; transforming the plurality of functional code blocks into a plurality of generic code representations of its functionality by at least one of refactoring and tokenizing the plurality of functional code blocks; comparing each of the plurality of generic code representations with a plurality of previously characterized malicious code representations; and in response to a positive correlation from the comparison, identifying the executable code as containing malicious code. In embodiments, the executable code may be executable software, a script, a byte code file, machine code, and the like. In embodiments, once the plurality of generic code representations has been generated, the present invention may evaluate each generic code representation separately for the presence of malicious code, evaluate groups of generic code representations for the presence of malicious code, evaluate all generic code representations together for the presence of malicious code, and the like. That is, the presence of malicious code may be detected through the examination of a single generic code representation, or the malicious code may be detected through the examination of combinations or groups of generic code representations.

The methods and systems described herein may be deployed in part or in whole through a machine that executes computer software, program codes, and/or instructions on a processor. The present invention may be implemented as a method on the machine, as a system or apparatus as part of or in relation to the machine, or as a computer program product embodied in a computer readable medium executing on one or more of the machines. The processor may be part of a server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the invention. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the invention. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, EVDO, mesh, or other networks types.

The methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer to peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipments, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the invention has been disclosed in connection with the preferred embodiments shown and described in detail, various modifications and improvements thereon will become readily apparent to those skilled in the art. Accordingly, the spirit and scope of the present invention is not to be limited by the foregoing examples, but is to be understood in the broadest sense allowable by law.

All documents referenced herein are hereby incorporated by reference.

What is claimed is:

1. A computer program product embodied in a non-transitory computer readable medium that, when executing on one or more computers, performs the steps of:
   identifying a functional code block that performs a particular function within executable code;
   transforming the functional code block into two or more generic code representations of its functionality by tokenizing the functional code block into a first generic code representation wherein tokenizing includes converting at least one variable to a predefined generic code uniquely representing the at least one variable, and wherein tokenizing excludes instruction codes and by tokenizing the function code block into a second generic code representation with one or more flags and statistical information;
   selecting one of the two or more generic code representations as the generic code representation for further analysis based upon a type of file being analyzed;
   comparing the generic code representation with a previously characterized malicious code representation; and
   in response to a positive correlation from the comparison, identifying the executable code as containing malicious code.

2. The computer program product of claim 1, wherein tokenization eliminates portions in the functional code block that may be presented in differing versions of code that perform the same function as the functional code block.

3. The computer program product of claim 2, wherein the eliminated portions occur as a result of changed cross references due to variations in content and location of code between the differing versions.

4. The computer program product of claim 2, wherein the differences occur as a result of legitimate optimization techniques.

5. The computer program product of claim 2, wherein the differences occur as a result of malicious obfuscation techniques.

6. The computer program product of claim 1, wherein the executable code is at least one of executable software, a script, a byte code file, and machine code.

7. The computer program product of claim 1, wherein the malicious code representation is pulled from a library of malicious code representations.

8. The computer program product of claim 7, wherein the library is stored on the computer performing a local code scan.

9. The computer program product of claim 7, wherein the library is accessed through a network.

10. The computer program product of claim 7, wherein the library is accessed through a threat research center.

11. The computer program product of claim 7, wherein the library is updated from a threat research center.

12. The computer program product of claim 1 wherein the at least one variable includes a name or a memory address.

13. The computer program product of claim 1 wherein the instruction code is converted into an equivalent formulation.

14. A computer program product embodied in a non-transitory computer readable medium that, when executing on one or more computers, performs the steps of:
   identifying a functional code block that performs a particular function within executable code;
   transforming the functional code block into two or more generic code representations of its functionality including a first generic code representation obtained by refactoring the functional code block and converting at least one variable to a predefined generic code uniquely representing the at least one variable, and further including a second generic code representation having one or more flags and statistics;

selecting one of the two or more generic code representations as the generic code representation for further analysis based upon a type of file being analyzed;

comparing the generic code representation with a previously characterized malicious code representation; and in response to a positive correlation from the comparison, identifying the executable code as containing malicious code.

15. The computer program product of claim 14, wherein refactoring eliminates portions in the functional code block that may be presented in differing versions of code that perform the same function as the functional code block.

16. The computer program product of claim 15, wherein the eliminated portions occur as a result of changed cross references due to variations in content and location of code between the differing versions.

17. The computer program product of claim 15, wherein the differences occur as a result of legitimate optimization techniques.

18. The computer program product of claim 15, wherein the differences occur as a result of malicious obfuscation techniques.

19. The computer program product of claim 15, wherein the refactoring is lossy refactoring which selectively preserves certain generic characteristics of the code without needing to maintain actual executability.

20. The computer program product of claim 15, wherein the executable code is at least one of executable software, a script, a byte code file, and machine code.

21. The computer program product of claim 15, wherein the malicious code representation is pulled from a library of malicious code representations.

22. The computer program product of claim 21, wherein the library is stored on the computer performing a local code scan.

23. The computer program product of claim 21, wherein the library is accessed through a network.

24. The computer program product of claim 21, wherein the library is accessed through a threat research center.

* * * * *